(12) United States Patent
Haas

(10) Patent No.: US 12,347,577 B1
(45) Date of Patent: Jul. 1, 2025

(54) FUEL SALT SHIPPING SYSTEM

(71) Applicant: Natura Resources LLC, Abilene, TX (US)

(72) Inventor: Derek Haas, Austin, TX (US)

(73) Assignee: Natura Resources LLC, Abilene, TX (US)

( * ) Notice: Subject to any disclaimer, the term of this patent is extended or adjusted under 35 U.S.C. 154(b) by 0 days.

(21) Appl. No.: 18/632,611

(22) Filed: Apr. 11, 2024

(51) Int. Cl.
| G21C 19/18 | (2006.01) |
| G21C 19/32 | (2006.01) |
| G21C 19/08 | (2006.01) |
| G21F 5/002 | (2006.01) |
| G21F 5/06 | (2006.01) |

(52) U.S. Cl.
CPC ............. *G21C 19/18* (2013.01); *G21C 19/32* (2013.01); *G21C 19/08* (2013.01); *G21F 5/002* (2013.01); *G21F 5/06* (2013.01)

(58) Field of Classification Search
CPC ........ G21C 19/18; G21C 19/32; G21C 19/08; G21F 5/06; G21F 5/002; B65D 88/74
USPC ................................ 376/261, 264, 272, 308
See application file for complete search history.

(56) References Cited

U.S. PATENT DOCUMENTS

| 4,539,846 A | 9/1985 | Grossman |
| 6,064,687 A * | 5/2000 | Purcell ...................... F27B 3/28 373/102 |
| 6,125,912 A | 10/2000 | Branagan et al. |
| 6,143,431 A | 11/2000 | Webster |
| 6,258,185 B1 | 7/2001 | Branagan et al. |
| 6,699,455 B2 | 3/2004 | Bulan et al. |
| 6,841,140 B2 | 1/2005 | Nishmimura et al. |
| 7,400,697 B1 | 7/2008 | Carmack et al. |
| 7,931,080 B2 | 4/2011 | O'Brien |

(Continued)

FOREIGN PATENT DOCUMENTS

| CA | 2947917 | 5/2024 |
| CA | 3018050 | 5/2024 |

(Continued)

OTHER PUBLICATIONS

Holcomb, Fuel qualification for molten salt reactors. ORNL/TM-2022/2754. Oak Ridge National Laboratory (ORNL), Oak Ridge, TN (United States) 2022. (Year: 2022).*

(Continued)

*Primary Examiner* — Jack W Keith
*Assistant Examiner* — Daniel Wasil
(74) *Attorney, Agent, or Firm* — King & Spalding

(57) ABSTRACT

A fuel salt shipping system includes an outer container defining an outer containment volume and an inner container disposed within the outer containment volume, with the inner container defining an inner volume configured to contain a molten fuel salt. The inner container and the outer container cooperate to define an annulus region therebetween. The fuel salt shipping system further includes a fuel salt conduit penetrating the outer container and the inner container and fluidically coupling the inner volume to an external environment of the system. The fuel salt shipping system further includes a heating system including a heater disposed in the annulus space and configured to impart a heat output to the molten fuel salt of the inner volume and change a phase of the molten fuel salt held therein from a solid phase to a liquid phase.

14 Claims, 10 Drawing Sheets

(56) References Cited

U.S. PATENT DOCUMENTS

| | | |
|---|---|---|
| 7,980,304 B2 | 7/2011 | O'Brien |
| 8,186,430 B2 | 5/2012 | O'Brien |
| 8,746,440 B2 | 6/2014 | Williamson et al. |
| 8,767,905 B2 | 7/2014 | Neeley et al. |
| 8,945,354 B2 | 2/2015 | Williamson et al. |
| 8,968,547 B2 | 3/2015 | Loewen et al. |
| 9,208,909 B2 | 12/2015 | Runkle et al. |
| 9,299,464 B2 | 3/2016 | Venneri |
| 9,305,673 B2 | 4/2016 | Heinold et al. |
| 9,368,241 B2 | 6/2016 | Loewen et al. |
| 9,475,706 B2 | 10/2016 | Policke et al. |
| 9,620,248 B2 | 4/2017 | Venneri |
| 9,761,336 B2 | 9/2017 | Caine et al. |
| 9,941,025 B2 | 4/2018 | Ahlfeld et al. |
| 9,968,899 B1 | 5/2018 | Gellaboina |
| 10,032,528 B2 | 7/2018 | Venneri |
| 10,056,160 B2 | 8/2018 | LeBlanc |
| 10,109,378 B2 | 10/2018 | Snead |
| 10,221,499 B2 | 3/2019 | Miller et al. |
| 10,280,527 B2 | 5/2019 | Loewen et al. |
| 10,311,981 B2 | 6/2019 | Hackett et al. |
| 10,438,705 B2 | 10/2019 | Cheatham, III |
| 10,475,543 B2 | 11/2019 | Venneri |
| 10,497,479 B2 | 12/2019 | Abbott |
| 10,497,480 B2 | 12/2019 | Cheatham, III et al. |
| 10,515,729 B2 | 12/2019 | Horn et al. |
| 10,566,096 B2 | 2/2020 | Czerwinski |
| 10,650,934 B2 | 5/2020 | Caine et al. |
| 10,665,356 B2 | 5/2020 | Abbott |
| 10,734,122 B2 | 8/2020 | Cisneros, Jr. |
| 10,741,293 B2 | 8/2020 | Abbott |
| 10,867,710 B2 | 12/2020 | Cisneros, Jr. |
| 10,878,971 B2 | 12/2020 | Venneri |
| 10,923,238 B2 | 2/2021 | Abbott |
| 11,031,140 B2 | 6/2021 | Hunt et al. |
| 11,075,013 B2 | 7/2021 | Abbott et al. |
| 11,075,015 B2 | 7/2021 | Cisneros, Jr. |
| 11,101,048 B2 | 8/2021 | Venneri |
| 11,133,114 B2 | 9/2021 | Hackett et al. |
| 11,145,424 B2 | 10/2021 | Abbott |
| 11,189,383 B2 | 11/2021 | Snead |
| 11,276,503 B2 | 3/2022 | Cisneros, Jr. et al. |
| 11,342,084 B2 | 5/2022 | Cheatham, III et al. |
| 11,424,041 B2 | 8/2022 | Fisher et al. |
| 11,837,374 B2 | 12/2023 | Corbin et al. |
| 11,984,232 B2 | 5/2024 | Venneri |
| 11,990,249 B2 | 5/2024 | Cheatham, III et al. |
| 11,990,815 B2 | 5/2024 | Stubsgaard |
| 2004/0070121 A1* | 4/2004 | Ohnsmann ............ B22D 41/01 266/166 |
| 2006/0000711 A1 | 1/2006 | Lin |
| 2013/0322589 A1 | 12/2013 | Bracey et al. |
| 2014/0185733 A1 | 7/2014 | Povirk et al. |
| 2014/0224705 A1* | 8/2014 | Minor .................. G21F 5/012 206/595 |
| 2015/0040727 A1 | 2/2015 | Kosslow |
| 2015/0310948 A1 | 10/2015 | Venneri |
| 2016/0189813 A1 | 6/2016 | Cisneros, Jr. |
| 2016/0217874 A1 | 7/2016 | Dewan et al. |
| 2017/0292179 A1 | 10/2017 | Hackett |
| 2017/0301413 A1 | 10/2017 | Cisneros, Jr. |
| 2017/0301418 A1 | 10/2017 | Dodson et al. |
| 2019/0015806 A1 | 1/2019 | Gellaboina |
| 2020/0027581 A1 | 1/2020 | Hackett et al. |
| 2020/0087156 A1 | 3/2020 | Kelleher |
| 2020/0122109 A1 | 4/2020 | Kruizenga et al. |
| 2020/0180975 A1 | 6/2020 | Benson |
| 2020/0373024 A1 | 11/2020 | Gramlich |
| 2021/0130181 A1 | 5/2021 | Brown et al. |
| 2021/0210235 A1 | 7/2021 | Venneri |
| 2022/0005617 A1 | 1/2022 | Snead |
| 2022/0115149 A1 | 4/2022 | Barringer et al. |
| 2022/0115150 A1 | 4/2022 | Hackett et al. |
| 2022/0139576 A1 | 5/2022 | Inman et al. |
| 2022/0139577 A1 | 5/2022 | Cisneros, Jr. et al. |
| 2022/0336118 A1 | 10/2022 | Corbin et al. |
| 2023/0166982 A1 | 6/2023 | Baer |
| 2023/0290528 A1 | 9/2023 | Venneri |
| 2023/0323695 A1 | 10/2023 | Johnson |
| 2023/0368933 A1 | 11/2023 | Yeager |
| 2023/0377763 A1 | 11/2023 | Botha et al. |
| 2023/0392274 A1 | 12/2023 | Harb |
| 2023/0395269 A1 | 12/2023 | Jesse, III et al. |
| 2023/0411024 A1 | 12/2023 | Blamer |
| 2024/0071639 A1 | 2/2024 | Tilton |
| 2024/0120118 A1 | 4/2024 | Aleshin et al. |

FOREIGN PATENT DOCUMENTS

| | | | | |
|---|---|---|---|---|
| CN | 102795601 | | 11/2012 | |
| CN | 106128533 | | 11/2016 | |
| CN | 107230506 | | 10/2017 | |
| CN | 106158053 | | 11/2017 | |
| CN | 109207128 | | 1/2019 | |
| CN | 105838339 | | 3/2019 | |
| CN | 109509562 | | 3/2019 | |
| CN | 106840765 | | 4/2019 | |
| CN | 109671510 | | 4/2019 | |
| CN | 106477618 | | 7/2019 | |
| CN | 106221678 | | 9/2019 | |
| CN | 107469628 | | 10/2019 | |
| CN | 108109710 | | 10/2019 | |
| CN | 209496626 | | 10/2019 | |
| CN | 108511089 | | 12/2019 | |
| CN | 106517097 | | 2/2020 | |
| CN | 110884787 A | * | 3/2020 | ........... B65D 88/744 |
| CN | 210803355 | | 6/2020 | |
| CN | 109637682 B | | 9/2020 | |
| CN | 106957636 | | 10/2020 | |
| CN | 112062567 | | 12/2020 | |
| CN | 112357885 | | 2/2021 | |
| CN | 109097001 | | 3/2021 | |
| CN | 110689984 | | 3/2021 | |
| CN | 109231241 | | 4/2021 | |
| CN | 110444311 | | 5/2021 | |
| CN | 113044378 A | * | 6/2021 | ............. B65D 25/14 |
| CN | 113174240 | | 7/2021 | |
| CN | 213707743 | | 7/2021 | |
| CN | 113372886 | | 9/2021 | |
| CN | 111334258 | | 12/2021 | |
| CN | 113860350 | | 12/2021 | |
| CN | 114086111 | | 2/2022 | |
| CN | 112695229 | | 3/2022 | |
| CN | 112429772 | | 5/2022 | |
| CN | 112479256 | | 5/2022 | |
| CN | 111627569 | | 7/2022 | |
| CN | 114842989 | | 8/2022 | |
| CN | 111739670 | | 9/2022 | |
| CN | 113044378 | | 9/2022 | |
| CN | 114288837 | | 9/2022 | |
| CN | 217405118 | | 9/2022 | |
| CN | 112551567 | | 11/2022 | |
| CN | 113603059 | | 11/2022 | |
| DE | 2747080 | | 4/1979 | |
| EP | 4052274 | | 2/2024 | |
| EP | 4235697 | | 2/2024 | |
| EP | 3437108 | | 4/2024 | |
| EP | 4354460 | | 4/2024 | |
| JP | 2002147695 | | 5/2002 | |
| JP | 2021004406 A | * | 1/2021 | |
| KR | 10-2021-0008784 | | 1/2002 | |
| WO | WO 2015094450 | | 10/2015 | |
| WO | WO 2017019620 | | 2/2017 | |
| WO | WO 2017032379 | | 3/2017 | |
| WO | WO 2017106509 | | 6/2017 | |
| WO | WO 2017171937 | | 10/2017 | |
| WO | WO 2017172177 | | 10/2017 | |
| WO | WO 2017172948 | | 10/2017 | |
| WO | WO 2017192611 | | 11/2017 | |
| WO | WO 2018026536 | | 2/2018 | |
| WO | WO 2018031681 | | 2/2018 | |
| WO | WO 2018052529 | | 5/2018 | |
| WO | WO 2018147893 | | 8/2018 | |

(56) References Cited

FOREIGN PATENT DOCUMENTS

| WO | WO 2018169588 | 10/2018 |
| WO | WO 2018213669 | 1/2019 |
| WO | WO 2022076084 | 6/2022 |

OTHER PUBLICATIONS

Armijo, Sandia National Laboratories NSTTF Molten Salt R&D Capabilities. SAND2021-5607PE. Sandia National Lab (SNL-NM), Albuquerque, NM (United States), 2021. (Year: 2021).*

Shaffer, Preparation and Handling of Salt Mixtures for the Molten Salt Reactor Experiment. ORNL-4616. Oak Ridge National Lab (ORNL), Oak Ridge, TN (United States), 1971. (Year: 1971).*

Chandler, "Preparation and Processing of MSRE Fuel" at Symposium on Reprocessing of Nuclear Fuels: Containing Papers Presented Aug. 1969 at Iowa State University, Ames, Iowa. vol. 690801. US Atomic Energy Commission, Division of Technical Information, 1969, pp. 97-108. (Year: 1969).*

* cited by examiner

FUEL SALT SHIPPING SYSTEM

TECHNICAL FIELD

The described examples relate generally to systems, devices, and techniques for fuel salt shipping.

BACKGROUND

Molten salt nuclear reactor systems may require a quantity of fuel salt for operation. In one example, fuel salt may include $LiF$—$BeF_2$—$UF_4$, though other compositions of fuel salts may be utilized as fuel salts within the reactor system. The fuel salt may include a fissile material to create thermal power via nuclear reactions therein. Broadly, the fuel salt may exist in a solid phase at or near room temperature. The fuel salt may transition from the solid phase to a liquid phase at an elevated temperature, such as a temperature of around 400° C. or greater. The fuel salt may be used in the nuclear reactor system in the liquid phase or molten state whereby the fuel salt is maintained at such elevated temperature. In many cases, it may be desirable to ship a quantity of the fuel salt to or from a reactor site (e.g., a deployment site or other site at which the reactor system is located). However, shipping such fuel salt to a reactor site may be hindered by numerous safety considerations, including without limitation, maintaining a double-wall containment about the fuel salt and managing a phase, and phase change, of the fuel salt between the liquid and solid phase. As such, there is a need for systems and techniques to facilitate the transfer of fuel salt to a reactor site, particularly where such fuel salt reverts to solid phase at or near room temperature.

SUMMARY

In one example, a fuel salt shipping system is disclosed. The fuel salt shipping system includes an outer container defining an outer containment volume. The fuel salt shipping system further includes an inner container disposed within the outer containment volume and defining an inner volume configured to contain a molten fuel salt. The inner container and the outer container cooperate to define an annulus region therebetween. The fuel salt shipping system further includes a fuel salt conduit penetrating the outer container and the inner container, and fluidically coupling the inner volume to an external environment of the system. The fuel salt conduit is selectively closeable to maintain a seal between the inner volume and the external environment. The fuel salt shipping system further includes a heating system including a heater disposed in the annulus space. The heater is configured to impart a heat output to the molten fuel salt of the inner volume and change a phase of the molten fuel salt held therein from a solid phase to a liquid phase.

In another example, the fuel salt conduit may be configured to permit entry and exit of the molten fuel salt to and from the inner volume in the liquid phase or in the solid phase.

In another example, the heat output from the heater may be configured to maintain the molten fuel salt in the liquid phase within the inner volume.

In another example, the heater may be a bank of heaters of the heating system disposed in the annulus space. The bank of heaters may cooperate to collectively impart the heat output to the molten fuel salt.

In another example, the annulus space may be filled with an insulative material.

In another example, the fuel salt shipping system further includes neutron absorbers disposed within the insulative material.

In another example, the annulus space may be filled with an inert gas.

In another example, the system may further include an inert gas conduit penetrating the outer container and the inner container, and fluidically coupling the inner volume to the external environment of the system. The inert gas conduit may be selectively closeable to maintain a seal between the inner volume and the external environment. Further, the inert gas conduit may be configured to permit entry and exit of inert gas to and from the inner volume.

In another example, the inert gas conduit may be a first inert gas conduit disposed on a first side of the outer container and the inner container that is common with the fuel salt conduit. In this regard, the system may further include a second inert gas conduit penetrating the outer container and the inner container, and fluidically coupling the inner volume to the external environment of the system. The second inert gas conduit may be selectively closeable to maintain a seal between the inner volume and the external environment. The second inert gas conduit may be disposed on a second side of the outer container and the inner container opposite the second side.

In another example, the system may be configured, in a first, loading configuration, while remaining upright with the first side arranged opposite a ground surface, to: (i) receive a first liquid flow of the fuel salt via the fuel salt conduit, and (ii) displace a volume of inert gas from the inner volume through the first inert gas conduit via said first liquid flow of the fuel salt. The system may be further configured, in a second, unloading configuration, while remaining inverted with the second side arranged opposite a the ground surface, to: (i) gravitationally release a second liquid flow of the fuel salt via the fuel salt conduit, and (ii) backfill an evacuated portion of the inner volume with an inert gas flow through the second inert gas conduit.

In another example, the system may be further configured, in an intermediate, transport configuration to: (i) permit the molten fuel salt of the first liquid flow to transition from the liquid phase to the solid phase, and (ii) cause the molten salt to subsequently transition from the solid phase to the liquid phase, using the heating system, and thereby product the second liquid flow.

In another example, the fuel salt shipping system may further include monitoring equipment disposed proximal the fuel salt conduit that is configured to detect one or both of a neutron level and gas pressure from the inner containment volume.

In another example, the system may further include a set of end caps. The set of end caps may be removably couplable with opposite ends of the outer container and defining a further containment barrier thereabout. Further, at least one end cap of the set of end caps may fully encompass and close the fuel salt conduit and the monitoring equipment therein.

In another example, a deployment system for a molten salt reactor is disclosed. The deployment system includes a fuel salt shipping system, such as any of the fuel salt shipping systems disclosed herein. The deployment system further includes a reactor system including functional components of a molten salt reactor. The deployment system further includes a fuel preparation system or module couplable with the fuel salt shipping system and the reactor system and configured to transfer the fuel salt to the reactor module.

In another example, the fuel preparation system may be further configured to treat the fuel salt enroute to the reactor module, including filtering the fuel salt, chemically altering the fuel salt, or heating the fuel salt.

In another example, the fuel salt shipping system, the reactor system, and the fuel preparation system may be each individually deliverable to a reactor deployment site via a semi-trailer truck.

In another example, a method of transporting molten salt is disclosed. The method includes gravitationally loading a first liquid flow of fuel salt into an inner volume of an inner container of a fuel salt shipping system. The fuel salt shipping system further includes an outer container defining an outer containment volume. The inner container is disposed within the outer containment volume and cooperates with the outer container to define an annulus region therebetween. The method further includes solidifying the fuel salt within the inner volume by permitting the fuel salt to transition from a liquid phase to a solid phase. The method further includes transporting the fuel salt shipping system from a filling location to a reactor deployment site. The method further includes causing the fuel salt to transition from the solid phase to the liquid phase using a heating system disposed at least particularly within the annulus space. The method further includes causing the liquid phase fuel salt to exit the inner volume at the reactor deployment site.

In another example, the causing of the liquid phase fuel salt to exit the inert volume may further include gravitationally draining the fuel salt from the inner volume.

In another example, the gravitationally loading of the first liquid flow of fuel salt may further include displacing a volume of inert gas from the inner volume through an inert gas conduit.

In another example, the causing of the liquid phase fuel salt to exit the inner volume may further include backfilling an evacuate portion of the inner volume with an inert gas flow from an inert gas conduit.

In another example, the causing of the liquid phase fuel salt to exit the inner volume may further include pressurizing the inner volume with an inert gas flow from an inert gas conduit.

In addition to the example aspects described above, further aspects and examples will become apparent by reference to the drawings and by study of the following description.

Figure 1:
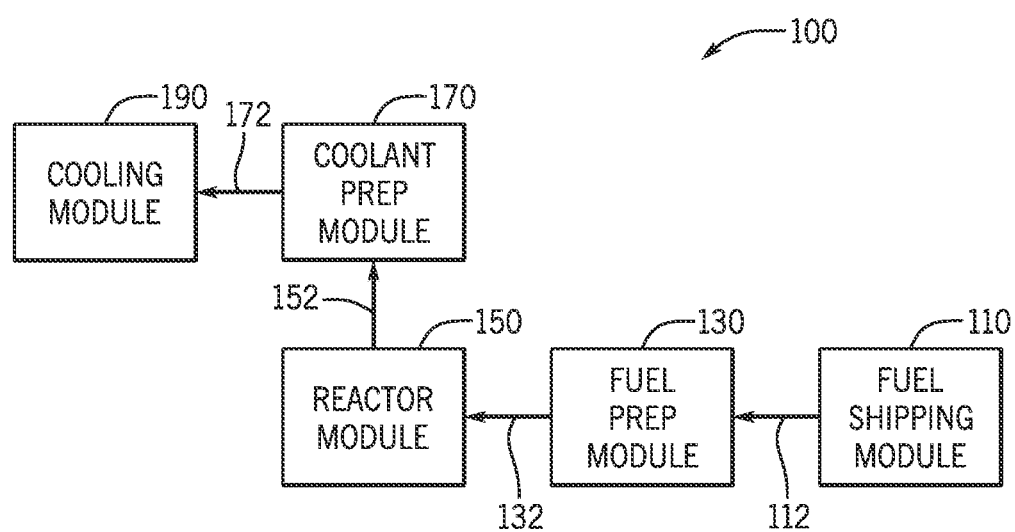
FIG. 1 depicts a functional diagram of an example deployment system for a molten salt nuclear reactor.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

The description that follows includes sample systems, methods, and apparatuses that embody various elements of the present disclosure. However, it should be understood that the described disclosure may be practiced in a variety of forms in addition to those described herein.

The following disclosure relates generally to systems, devices, and techniques for fuel salt shipping. Molten salt nuclear reactor systems may require a quantity of fuel salt for operation. In one example, fuel salt may include LiF—BeF$_2$—UF$_4$, though other compositions of fuel salts may be utilized as fuel salts within the reactor system. The fuel salt may include a fissile material to create thermal power via nuclear reactions therein. Broadly, the fuel salt may exist in a solid phase at or near room temperature. The fuel salt may transition from the solid phase to a liquid phase at an elevated temperature, such as a temperature of around 400° C. or greater. The fuel salt may be used in the nuclear reactor system in the liquid phase or molten state whereby the fuel salt is maintained at such elevated temperature. In many cases, it may be desirable to ship a quantity of the fuel salt to or from a reactor site (e.g., a deployment site or other site at which the reactor system is located). However, shipping such fuel salt to or from a reactor site may be hindered by numerous safety considerations, including without limitation, maintaining a double-walled containment about the fuel salt and managing phase and phase change of the fuel salt between the liquid and solid phase. Conventional approaches may lack the ability to manage such phase change properties in a molten fuel salt, particularly while maintain an inert environment about the fuel salt.

To mitigate these and other challenges, the fuel salt shipping system of the present disclosure includes a double-walled containment structure that maintains fuel salt therein in an inert environment. Moreover, the fuel salt shipping system is configured to manage a phase, and phase change, of the fuel salt held within said double-walled environment. The fuel salt shipping system may accomplish the foregoing functionality while maintaining an inert environment, for example, such as that blanketed by an inert gas including He, about the fuel salt held therein. Additionally, and as described in greater detail herein, the fuel salt system may function to gravitationally load and unload the fuel salt and/or otherwise be adaptable to load and unload the fuel salt in molten or liquid form. In this regard, the fuel salt system may be transportable, including being transportable on public roads and highways, to or from a deployment or reactor site. At the reactor site, the fuel salt of the fuel salt system may be unloaded therefrom and transferred to a nuclear reactor system or "deployment system," as described herein.

To facilitate the foregoing, the fuel salt shipping system may include an outer container defining an outer volume, and an inner container disposed within the outer container and defining an inner volume configured to contain a molten fuel salt. The inner container may be placed within the outer container and cooperate to define an annulus region therebetween. The inner container and the outer container may provide a double-walled containment about the fuel salt. Fuel salt may be permitted to enter the inner volume of the inner container via one or more fuel salt conduits. Such fuel salt conduits may fluidically couple the inner volume to an external environment of the fuel salt system. The fuel salt conduit may be selectively closeable to maintain a seal between the inner volume and the external environment. For example, the fuel salt conduit may include one or more isolation valves in order to maintain a double point sealing of the fuel salt during storage and transportation, and that are operatable to release the fuel salt when needed. Further, the fuel salt shipping system may include a heating system including a heater disposed in the annulus space. The heater may be configured to impart a heat output to the molten fuel salt held within the inner volume in order to change a phase of the molten fuel salt from a solid to a liquid. The heater may be selectively disengaged in order to allow the molten fuel salt to cool and transition from a liquid to a solid.

In operation, the fuel salt shipping system may initially include the inner volume filled with an inert gas, for example, filled via one or more inert gas conduits connected thereto. A fuel salt may be loaded into the inner volume in a liquid phase via the fuel salt conduit. The loading of the fuel salt in a liquid phase may displace the inert gas held therein out through the inert gas conduit. By introducing the fuel salt into an inert environment, the fuel salt may be pre-treated, purified or otherwise preprocessed for use prior to being introduced into the inner volume. Such preprocessing may reduce or eliminate the need to process the fuel salt at the reactor or deployment site. During the filling of the inner volume with the liquid phase molten fuel salt, the heaters of the heating system may remain active in order to maintain the fuel salt in the liquid phase. Upon the conclusion of said filling, the heaters may be disengaged in order to allow the molten fuel salt to cool and transition to a solid phase. In such configuration, the fuel salt shipping system (including the solid phase fuel salt held therein) may be transported via public roads and highways to a site of a reactor that will use the fuel salt held by the fuel salt shipping system. Similarly, the fuel salt shipping system may be used to load liquid phase fuel salt from a reactor system and transported via public roads and highways to an off-site location. In some cases, the entire fuel salt shipping system may be configured to fit on, or be towed by, a single semi-trailer truck. Once arrived at the reactor site, the heating system may operate the heaters to impart a heat output that causes the solid held within the reactor to transition from the solid phase to the liquid phase. In turn, the fuel salt shipping system may cause the liquid phase fuel salt to exit the fuel salt shipping system and transfer to one or more modules or assemblies of the reactor system onsite. For example, in some cases, the fuel salt shipping system may cause the liquid phase fuel salt to gravitationally drain from the inner volume and transfer into a transferring piping (with optional heat trace or heat wrapping) that routes the liquid molten salt material to the onsite reactor system. As described in greater detail herein, the fuel salt system may be inverted at the reactor site such that the fuel salt conduit through which the fuel salt initially entered the inner volume may be proximal a ground surface to support gravitational draining therethrough. In other cases, the fuel salt system may include a second fuel salt conduit specifically adapted for gravitational draining of the inner volume. In other example, other arrangements and constructions of the fuel salt system are contemplated and described herein.

Turning to the Drawings, FIG. 1 depicts a functional diagram of an example deployment system 100. The deployment system 100 is shown in FIG. 1 as including a fuel shipping module 110, a fuel prep module 130, a reactor module 150, a coolant prep module 170, and a cooling module 190. The fuel shipping module 110 may include or be one or more fuel salt shipping systems, such as those described generally above and described in more detail below. The fuel shipping module 110 may be used to supply a quantity of fuel salt to the deployment system 100 and to optionally receive a spent used quantity of fuel salt or other waste therefrom.

The deployment system 100 may include a collection of modules or systems that collectively operate to supply the functional components of a molten salt nuclear reactor to an off-site location, such as a "deployment site." For example, the deployment system 100 may include or be any of the deployment systems described in U.S. application Ser. No. 18/529,510, titled "DEPLOYMENT METHOD AND SYSTEMS FOR MOLTEN SALT REACTORS," which is incorporated by reference herein in its entirety. In one example, as shown in FIG. 1, the deployment system 100 may be used to establish and set up operation of a molten salt reactor. For example, each of the fuel shipping module 110, the fuel prep module 130, the reactor module 150, the coolant prep module 170, and the cooling module 190 may each be transported to a remote deployment site via one or more semi-trailer trucks. The foregoing modules may be transported to the deployment site with the reactor module 150 including a coolant salt therein for purposes of storage and transport. Further, the fuel shipping module 110 may be transported to the deployment site including a fuel salt therein for purposes of storage and transport. At the deployment site, the modules may be coupled to one another, as shown in FIG. 1, to facilitate transfer of the coolant and fuel salts to appropriate modules to initiate start up of the nuclear reactor system.

For example, at the deployment site, the reactor module 150 may initiate a first coolant salt flow 152 from the reactor module 150 to the coolant prep module 170. The coolant prep module 170 may, in some cases, operate to treat the coolant salt therein. The coolant prep module 170 may subsequently operate to initiate a second coolant salt flow 172 from the coolant prep module 170 to the cooling module 190 whereat the coolant salt may be used as a primary heat exchange medium in the nuclear reactor system. As a further illustration, at the deployment site, the fuel shipping module 110 may initiate a first fuel salt flow 112 from the fuel shipping module 110 to the fuel prep module 130. The fuel prep module 130 may, in some cases, operate to treat the fuel salt therein. The fuel prep module 130 may subsequently operate to initiate a second fuel salt flow 132 from the fuel prep module 130 to the reactor module 150 whereat the fuel salt may be used to create thermal energy via fission reactions in the nuclear reactor system. In operation, the reactor module 150 may include the functional components of a molten salt nuclear reactor, and the cooling module 190 may include the functional components of a primary heat transfer system. The primary heat transfer system of the cooling module 190 may be coupled with the reactor module 150 to remove heat from the reactor module 150, which is generated by said nuclear reactions.

Figure 2:
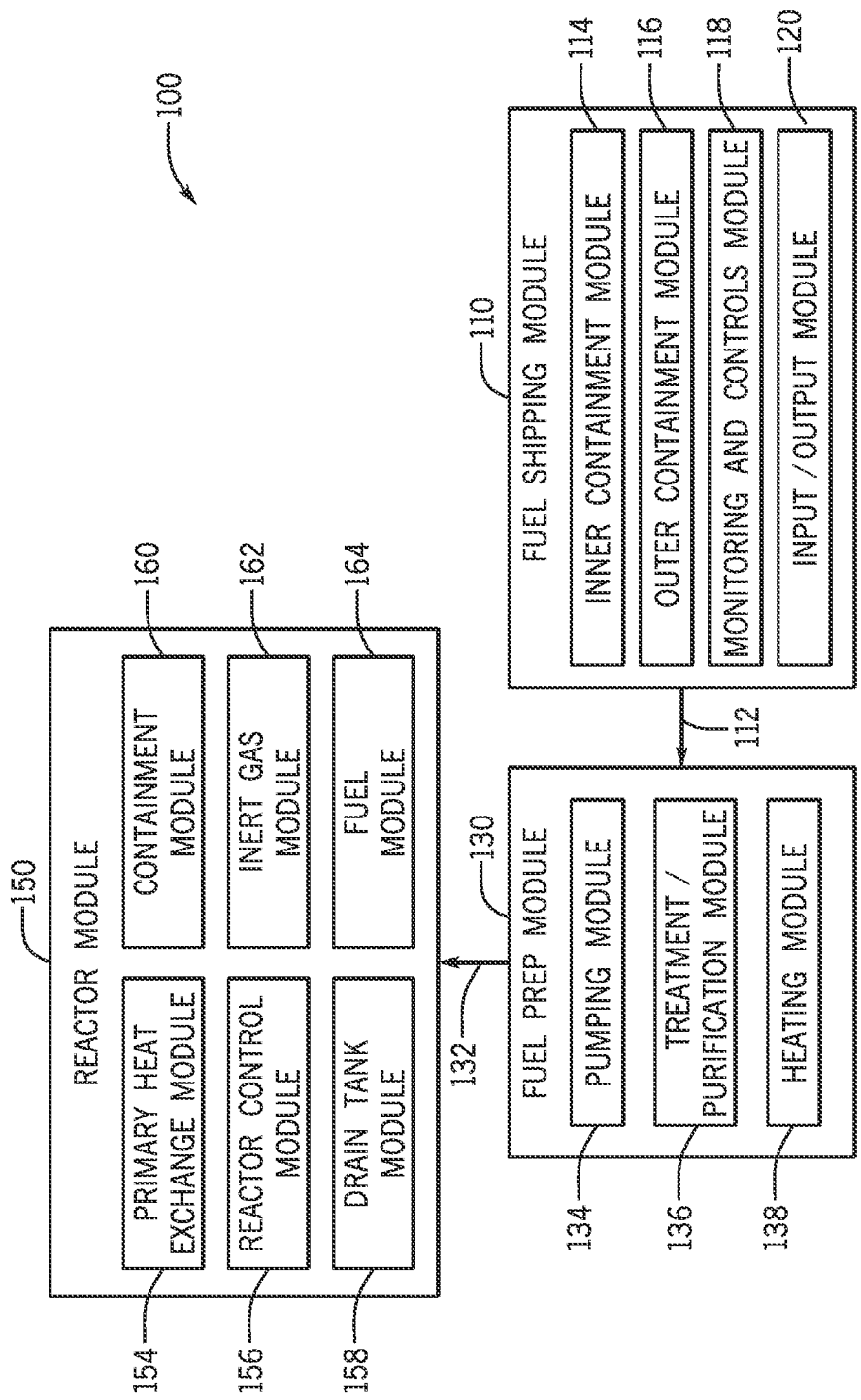
FIG. 2 depicts a functional diagram of a reactor module, a fuel prep module, and fuel shipping module.

While many configurations are possible and contemplated herein, FIG. 2 shows certain functional components of the reactor module 150, the fuel prep module 130, and the fuel shipping module 110 of the present disclosure. With respect to the reactor module 150, the reactor module 150 is shown as including a primary heat exchange module 154, a reactor control module 156, a drain tank module 158, a containment module 160, an inert gas module 162, and a fuel module 164. Broadly, the reactor module 150 may operate to produce heat via nuclear reactions that occurs within the reactor module 150, and to facilitate transfer said heat to another process (e.g., electricity generation, and so on), for example, using the cooling module 190.

To facilitate the foregoing, the primary heat exchange module 154, the reactor control module 156, the drain tank module 158, the containment module 160, the inert gas module 162, and the fuel module 164 of the reactor module 150 may be functional modules including or otherwise representing the functional components of a molten salt reactor. The reactor control module 156 may be configured to control nuclear reactions therein and may include a moderator and other associated components to control nuclear reactions of a fissile material circulated therethrough. The primary heat exchange module 154 may be operatively coupled with the reactor control module 156 and may be configured to remove heat generated by the nuclear reactions of the reactor control module 156. For example, the primary heat exchange module 154 may include one or more primary heat exchangers that transfer heat from a fuel salt of the reactor control module 156 to a primary coolant salt of the primary heat exchange module 154, and that transfers the coolant salt to the cooling module 190 for subsequent processing. With reference to the drain tank module 158, the drain tank module 158 may be operatively coupled to the reactor control module 156 and be configured to hold at least some of the fuel salt of the reactor module 150 in a subcritical state. In some cases, the drain tank module 158 may operate as a fail-safe module or mechanism whereby upon the occurrence of certain failure events or scenarios, the fuel salt of the reactor system defaults to the drain tank module 158 for storage in a subcritical state until such failure can be adequately resolved.

With reference to the containment module 160, the containment module 160 may include one or more vessels or shields that define an environmental and personnel barrier about the primary heat exchange module 154, the reactor control module 156, and the drain tank module 158 and/or any other associated equipment, particularly those that may be salt-bearing components or otherwise have the potential to emit radiation. Further, the containment module 160 may allow the reactor module 150 to be transported to the generation or deployment location as a single integrated unit, with all functional components held therein, in order to simplify assembly and operation on site. With reference to the inert gas module 162, the inert gas module 162 may be coupled with the primary heat exchange module 154, the reactor control module 156, the drain tank module 158 and/or other modules and components that hold the fuel salt, and may be configured to provide an inert gas to such modules and components. In some cases, the inert gas module 162 may be operable to control an inert gas pressure dynamically among such modules and components to facilitate movement of fluids therebetween, as described herein. With reference to the fuel module 164, the fuel module 164 may be coupled with the reactor control module 156 and/or the drain tank module 158, and may be operable to supply a fuel salt thereto. For example, the fuel module 164 may include various pumps, valves, piping and so on to facilitate the entry of the fuel salt into the reactor module 150.

With reference to the fuel prep module 130, the fuel prep module 130 may include any of a variety of functional components that are configured to move fluids (e.g., fuel salts and the like) between the reactor module 150 and the fuel shipping module 110. In this regard, with reference to the fuel prep module 130, this module may include a pumping module 134, a treatment/purification module 136, and a heating module 138. The pumping module 134 may be configured to induce a flow of a fluid (e.g., a fuel salt) through the fuel prep module 130, and as such, may include one or more pumps and associated equipment. Further, the treatment/purification module 136 may be configured to purify and/or chemically treat the fuel salt or other fluids flowing therethrough, and as such, may include one or more filtration devices or other devices adapted to alter a chemical or physical composition of the fuel salt. Further, the heating module 138 may be configured to heat the fuel salt or other fluid flowing therethrough, and as such, may include various heaters and associated equipment to maintain the fluid above a certain temperature.

With reference to the fuel shipping module 110, the fuel shipping module 110 may include any of a variety of functional components configured to store fuel salt for safe and efficient transport on public roads and highways. The fuel shipping module 110 is shown functionally with reference to FIG. 2 as including an inner containment module 114, an outer containment module 116, a monitoring and controls module 118, and an input/output module 120. The inner containment module 114 may define an inner most containment and storage vessel for fuel salt held therein. The outer containment module 116 may define an exterior containment vessel or shell about the inner containment module 114. The inner containment module 114 and the outer containment module 116 may cooperate to define a containment structure that satisfies certain regulatory requirements for transporting fuel salt on public roads and highways. For example, the inner containment module 114 and the outer containment module 116 may be configured to pass certain impact, puncture, fire and water immersion tests that qualify such structures as generally being safe for nuclear fuel transport under the Nuclear Regulatory Commission and/or other relevant industry or governmental guidelines.

As further shown in FIG. 2, the monitoring and controls module 118 may be operatively coupled or associated with the inner containment module 114 and the outer containment module 116. The monitoring and controls module 118 may be configured to provide real-time information concerning the status of any fuel salt held therein, including information concerning temperature and pressure. In some cases, the fuel shipping module 110, via the monitoring and controls module 118 or other appropriate module, may be configured to actively control or compensate for pressure and/or temperature within the inner containment module 114 and/or the outer containment module 116. FIG. 2 further shows the fuel shipping module 110 including an input/output module 120, which may be configured to facilitate the movement of any fuel salt held therein into and out from the various containment modules of the fuel shipping module 110. For example, the input/output module 120 may include or be associated with various valves and optional heaters that may cooperate to move the fuel salt as needed. In other cases, the fuel shipping module 110 may include more or fewer or different modules as may be needed for a given application.

Figure 3:
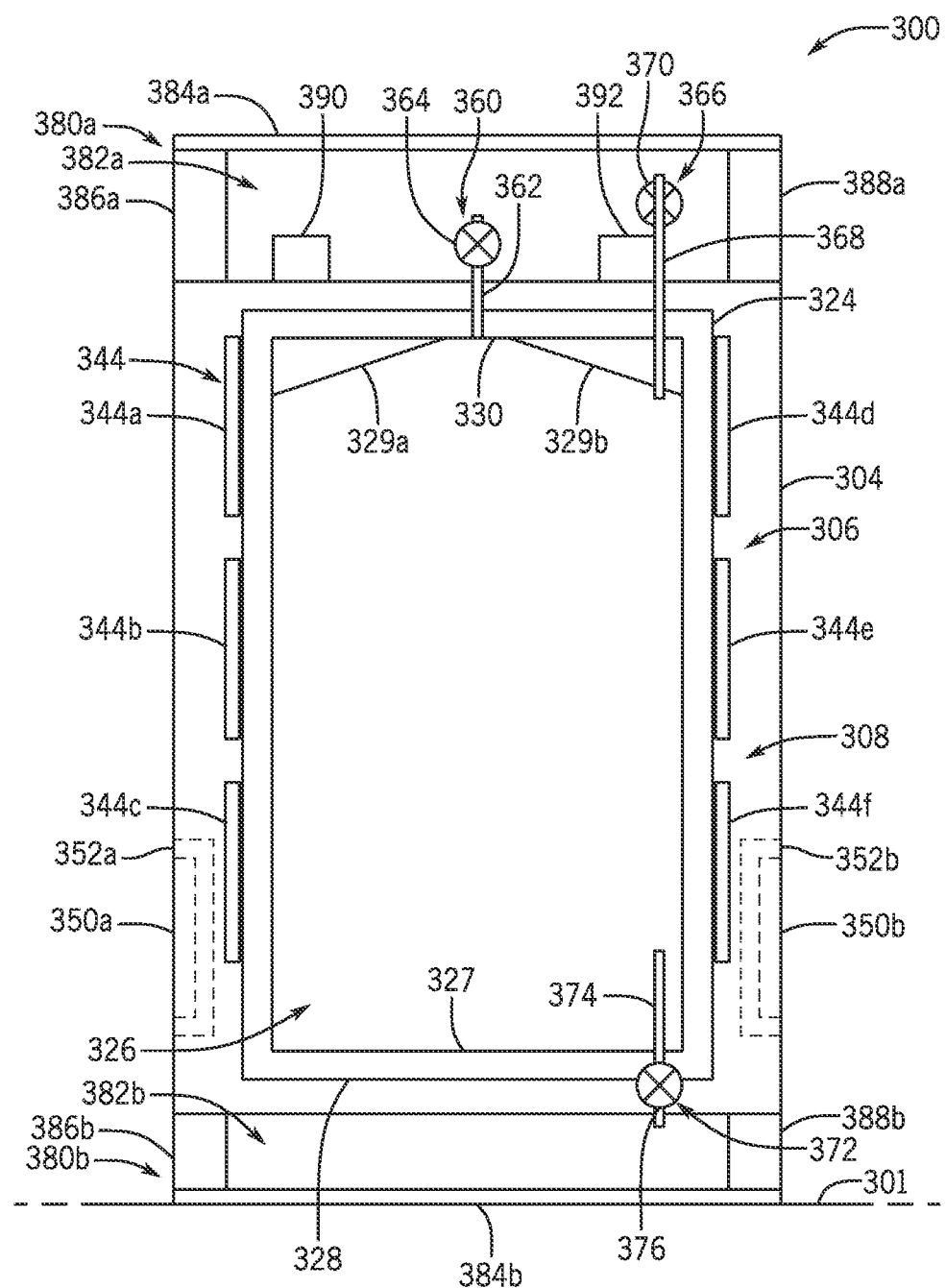
FIG. 3 depicts an example fuel salt shipping system in a first arrangement.
Figure 4:
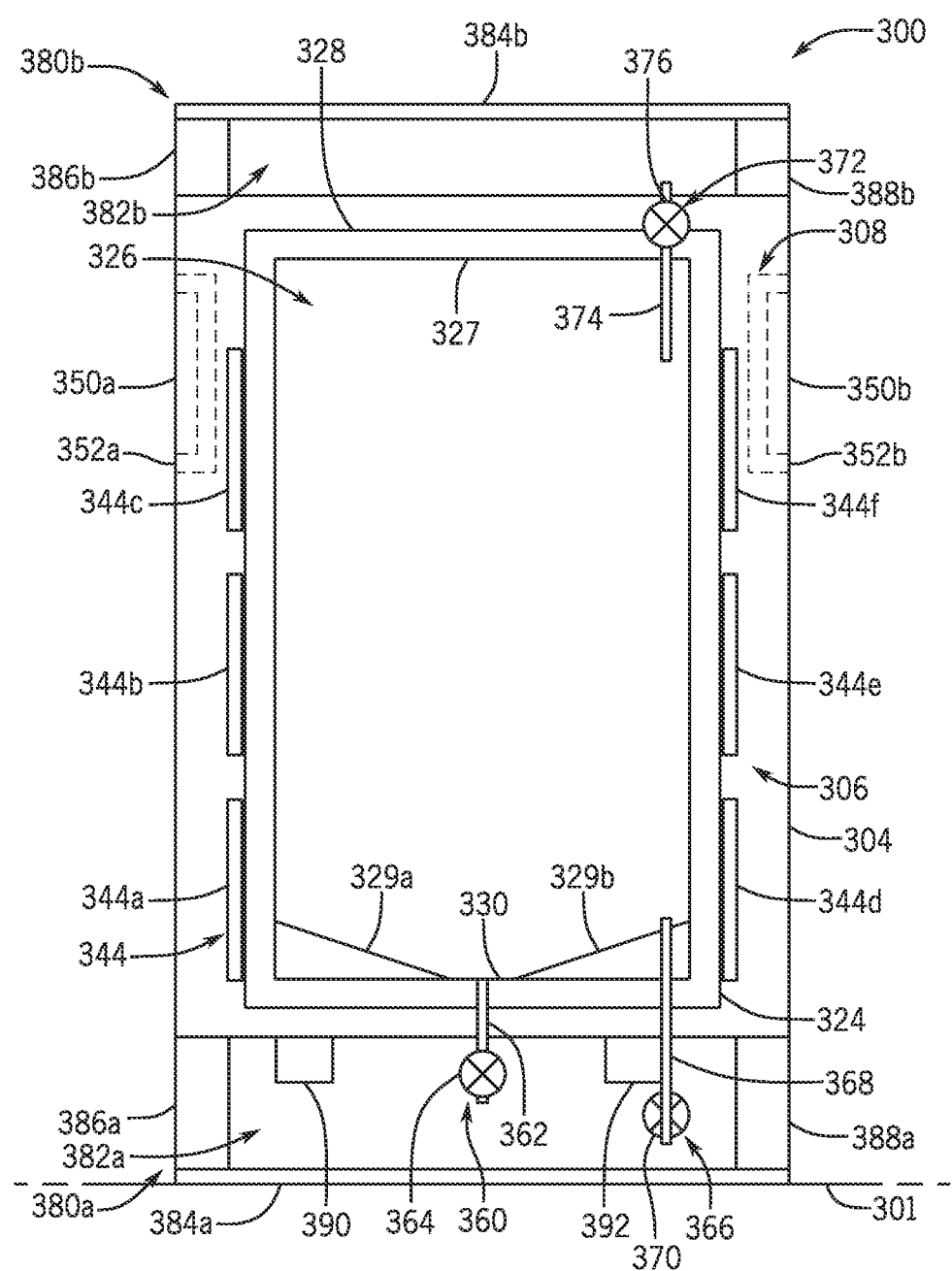
FIG. 4 depicts the fuel salt shipping system of FIG. 3 in a second arrangement.

While many structural configurations of the fuel shipping module 110 (and any of the fuel shipping modules described herein) are possible and contemplated herein, FIGS. 3-4 depict one example fuel shipping system 300 that may include the functional components of the fuel shipping module 110, as described above in relation to FIG. 2, for operation in the deployment system 100 described in relation to FIG. 1. In this regard, turning to FIG. 3, the fuel shipping system 300 may include an outer container 304 that defines an outer container volume 306. The fuel shipping system 300 may further including an inner container 324 that defines an inner volume 326. The inner container 324 may be disposed within the outer container volume 306. The outer container 304 and the inner container 324 may cooperate with one another to define an annulus region 308. The outer container 304 and the inner container 324 may collectively define a double-walled containment or perimeter about and fuel salt stored within the system 300. With reference to the inner container 324, the inner container 324 may have a substantially thick wall formed from a corrosion resistant (e.g., stainless steel material) that defines an inner surface 327 and an outer surface 328 opposite the inner surface 327. The inner surface 327 may be configured for contact with a molten salt material held within the inner volume 326, and be configured for contact with such molten salt material in both a liquid phase and a solid phase. The outer surface 328 may be configured to receive a heat input, described herein, such that the molten salt material may receive said heat in support of transitioning or maintaining the material in the liquid phase or solid phase.

The system 300 may include a heating system 344. As shown in FIG. 3, the heating system 344 may include one or more heaters disposed within the annulus region 308. For example, the heating system 344 of FIG. 3 is shown as including a first heater 344a, a second heater 344b, a third heater 344c, a fourth heater 344d, a fifth heater 344e, and a sixth heater 344f. In other cases, more or fewer heaters may be used. For example, the heating system 344 may include three single band heaters wrapped around a circumference of the inner container 324, such that the inner container includes heater bands proximal to a top, middle, and lower section of the inner container 324 causing uniform heating of the contents therein. In this example, the first single band heater may include the first heater 344a and fourth heater 344d, while the second single band heater includes the second heater 344b and fifth heater 344e and third single band heater includes the third heater 344c and the sixth heater 344f. The heaters of the heating system 344 may, collectively, be configured to impart a heat output to a molten fuel salt held within the inner volume 326. The heaters of the heating system 344 may further, collectively, be configured to change a phase of said molten fuel salt held within the inner volume from a solid phase to a liquid phase (i.e., melt the fuel salt). In this regard, and as described herein in relation to FIGS. 6A-6C, a molten fuel salt may be introduced into the inner volume 326 in a liquid form, and the heating system 344 may operate to influence and control a phase of the fuel salt as between a liquid and a solid phase. The system 300 may therefore be operable to transport the fuel salt in a different phase (e.g., in a solid phase) than the phase for which the fuel salt is received and expelled from the system 300 (e.g., in a liquid phase).

To facilitate the receipt of fuel salt into the inner volume 326, the system 300 is depicted in FIG. 3 as including a fuel salt conduit assembly 360. The fuel salt conduit assembly 360 may include a fuel salt conduit 362 and one or more isolation valves 364. The fuel salt conduit 362 may penetrate the outer container 304 and the inner container 324 and fluidically couple the inner volume 326 to an external environment of the system 300. The fuel salt conduit 362 may be selectively closeable by the one or more isolation valves 364. While a single isolation valve 364 is shown in FIG. 3 for purposes of clarity, it will be appreciated that two or more valves may be used as appropriate to maintain multiple points of isolation between the fuel salt of the inner volume 326 and the external environment of the system 300. The fuel salt conduit assembly 360 may disposed on a first side of the outer container 304, which may be a top side of the outer container 304 relative to a ground surface 301 in a loading configuration. In this regard, and as shown in greater detail with reference to FIGS. 6A-6C, molten fuel salt may be introduced into the fuel salt conduit assembly 360 is a liquid state, and such fuel salt may fill the inner volume 326 gravitationally. In a subsequent, unloading configuration, as shown in FIG. 4, the system may be inverted such that the fuel salt conduit assembly 360 is arranged on a bottom side of the outer container 304 relative to the ground surface 301. Accordingly, in the unloading configuration, the one or more isolation valves may be operated to exit the fuel salt from the inner volume 326 in a liquid phase. To facilitate the foregoing, FIGS. 3 and 4, show the inner container 324 as including angled region 329a, 329b that may funnel fuel salt held within the inner volume 326 toward a mouth region 330 whereat the liquid fuel salt may enter the fuel salt conduit 362.

The fuel salt shipping system 300 may also include one or more inert gas assemblies or conduits to facilitate a flow of inert gas to and from the inner volume 326. For example, and as shown in FIGS. 3 and 4, the system 300 may include an inert gas conduit assembly 366 and an inert gas conduit assembly 372. The inert gas conduit assembly 366 may include an inert gas conduit 368 and one or more isolation valves 370. The inert gas conduit 368 may penetrate the outer container 304 and the inner container 324 and fluidically couple the inner volume 326 to an external environment of the system 300. The inert gas conduit 368 may be selectively closeable by the one or more isolation valves 370 to maintain a seal between the inner volume 326 and the external environment. While a single isolation valve 370 is shown in FIG. 3 for purposes of clarity, it will be appreciated that two or more valves may be used as appropriate to maintain multiple points of isolation between the fuel salt of the inner volume 326 and the external environment of the system 300.

The inert gas conduit 368 is configured to permit entry and exit of an inert gas to and from the inner volume 326. As shown in FIGS. 3 and 4, the inert gas conduit 368 is disposed on a side of the outer container 304 common with the fuel salt conduit 362. In this regard, the inert gas conduit 368 may be adapted to facilitate entry and exit of inert gas from the inner volume 326 in a loading configuration. For example, in the loading configuration of FIG. 3, the inner volume 326 may be filled with an inert gas (e.g., He) via the inert gas conduit 368. The filling of the inner volume 326 with an inert gas may define an inert environment within the inner volume 326, which liquid fuel salt may flow into. Because the environment is inert, the environment may not necessarily interact with or hinder the chemistry of the fuel salt. Accordingly, the fuel salt may enter the inner volume 326 in a substantially purified state, and may not require substantial chemical processing once arrived at the reactor site. As the inner volume 326 fills with the liquid molten salt, inert gas may be displaced and exit through the inert gas conduit 368.

With reference to the inert gas conduit assembly 372, the inert gas conduit assembly 372 may include an inert gas conduit 374 and one or more isolation valves 376. The inert gas conduit 374 may penetrate the outer container 304 and the inner container 324 and fluidically couple the inner volume 326 to an external environment of the system 300. The inert gas conduit 374 may be selectively closeable by the one or more isolation valves 376 to maintain a seal between the inner volume 326 and the external environment. While a single isolation valve 376 is shown in FIG. 3 for purposes of clarity, it will be appreciated that two or more valves may be used as appropriate to maintain multiple points of isolation between the fuel salt of the inner volume 326 and the external environment of the system 300.

The inert gas conduit assembly 372 is configured to permit entry and exit of an inert gas to and from the inner volume 326. As shown in FIGS. 3 and 4, the inert gas conduit assembly 372 is disposed on a side of the outer container 304 opposite with the fuel salt conduit 362. In this regard, the inert gas conduit assembly 372 may be adapted to facilitate entry and exit of inert gas from the inner volume 326 in an unloading configuration. For example, in the unloading configuration of FIG. 4, the inner volume 326 may initially be filled with a liquid form of the fuel salt. As the fuel salt is drained from the inner volume 326, as described herein, the inner volume 326 may receive a flow of inert gas from the inert gas conduit 374 in order to fill the volume of exiting fuel salt. The receipt of such inert gas may facilitate the flowing of the fuel salt from the inner volume 326 while continuing to maintain an inert environment about the fuel salt as the fuel salt exits the system 300.

The fuel salt shipping system 300 is further shown in FIGS. 3 and 4 with additional components associated with the annulus region 308. The annulus region 308 may serve as a secondary containment space for the fuel salt in the event of a leak of fuel salt or other rupture of the inner container 324. Additionally, the annulus region 308 may provide certain insulative properties for the fuel salt. In one example, the annulus region 308 may be filled with an inert gas, such as a helium gas. Additionally or alternatively, the annulus region 308 may be filled with an insulative material, such as the optional insulative materials 352a, 352b shown in FIGS. 3 and 4. In some cases, such insulative material may fill a substantial majority of the annulus region 308, including encompassing some or all of the heating system 344. In other examples, the system 300 may also include certain neutron absorbers within the annulus region 308, such as the optional neutron absorbers 350a, 350b shown in FIGS. 3 and 4. In some cases, the neutron absorbers 350a, 350b may be placed substantially within the optional insulative materials 352a, 352b. In other examples, other systems and components may be placed within the annulus region 308 as may be appropriate for a given application, including certain monitors, sensors and other components to detect properties of the fuel salt held therein including detecting leaks.

In the example of FIGS. 3 and 4, a radioactivity monitor 390 and a gas pressure monitor 392 is arranged outside the annulus region 308 and adjacent the fuel salt conduit assembly 360 and the inert gas conduit assembly 366, respectively. The radioactivity monitor 390 may be a continuous monitor that is configured to monitor a level of radioactivity measured from the fuel salt stored in the inner volume 326 in both the liquid and the solid phase of the fuel salt. The gas pressure monitor 392 may be a continuous monitor that is configured to monitor a gas pressure within the inner volume 326, which may be used, for example, to determine a volume of inert gas to send to or receive from the inner volume 326. In other cases, other monitors and detectors may be used and implemented.

The fuel salt shipping system 300 may include multiple components to facilitate the structural stability of the system 300 in the loading configuration, the unloading configuration, and in an intermittent transport configuration during which the fuel salt shipping system is used to transport fuel salt in the solid state. In this regard, FIGS. 3 and 4 show the fuel salt shipping system as including end caps 380a, 380b. The end caps 380a, 380b may be arranged on opposing longitudinal ends of the outer container 304 and adapted to cover the ends and any components and conduits arranged thereon. For example, with reference to the end cap 380a, the end cap 380a may including a cap structure 384a and caps legs 386a, 388a extending from either side of the cap structure 384a. The cap structure 384a and cap legs 386a, 388a may collectively define an end cap volume 382a. The end cap 380a may fit over and cover each of the fuel salt conduit assembly 360, the inert gas conduit assembly 366, the radioactivity monitor 390, the gas pressure monitor 392 and/or any other components along the common longitudinal end of the outer container 304. For example, the end cap 380a may fit over each of the fuel salt conduit assembly 360, the inert gas conduit assembly 366, the radioactivity monitor 390, the gas pressure monitor 392 and/or any other components and disposed such components within the end cap volume 382a such that said components are shielded form an external environment of the system 300 by the end cap 380a. Further, the end cap 380a may serve as a structural component whereby the system 300 may rest on and be stabilized by the end cap 380a when the system 300 is in the inverted, unloading configuration shown in FIG. 4.

With reference to the end cap 380b, the end cap 380b may include a cap structure 384b and cap legs 386b, 388b extending from either side of the cap structure 384b. The cap structure 384b and the cap legs 386b, 388b may collectively define an end cap volume 382b. The end cap 380b may fit over and cover the inert gas conduit assembly 372 and/or any other components along the common longitudinal end of the outer container 304. For example, the end cap 380b may fit over the inert gas conduit assembly 372 and/or any other components and disposed such components within the end cap volume 382b such that said components are shielded from an external environment of the system 300 by the end cap 380b. Further, the end cap 380b may serve as a structural component whereby the system 300 may rest on and be stabilized by the end cap 380b when the system 300 is in the upright, loading configuration shown in FIG. 3.

Figure 5:
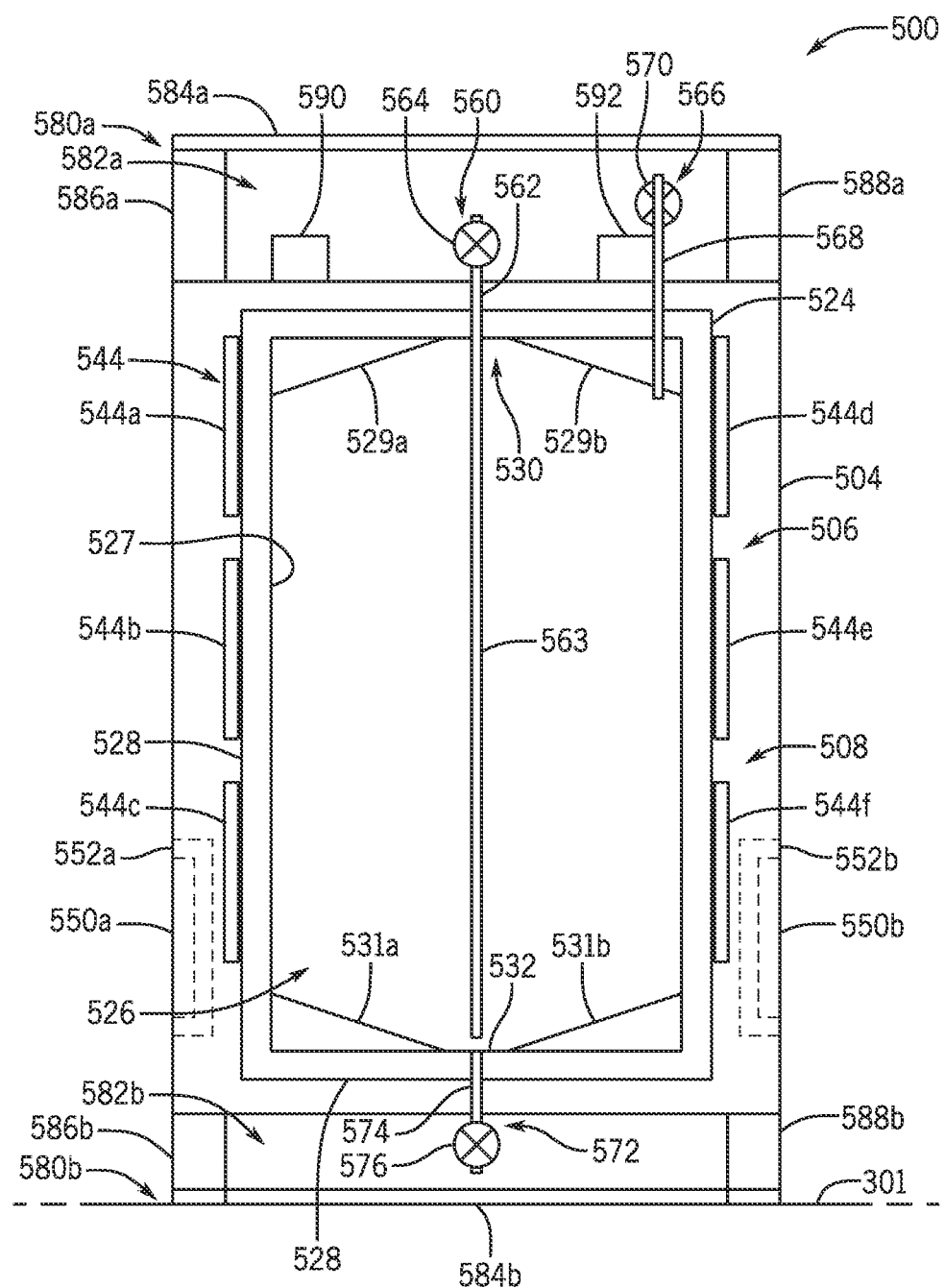
FIG. 5 depicts another example fuel salt shipping system.

FIG. 5 depicts another example fuel salt shipping system, a fuel salt shipping system 500. The fuel salt shipping system 500 may be or be a component of the fuel salt shipping module 110 described herein in relation to FIGS. 1 and 2. In this regard, the fuel salt shipping system 500 may be used in the deployment system 100 described herein. The fuel salt shipping system 500 may be substantially analogous to the fuel salt shipping system 300 and include an outer container 504, an outer container volume 506, an annulus region 508, an inner container 524, an inner volume 526, an inner surface 527, an outer surface 528, heating system 544, heaters 544a-544f, neutron absorbers 550a, 550b, insulative materials 552a, 552b, angled regions 529a, 529b, a mouth region 530, a radioactivity monitor 590, a gas pressure monitor 592, a fuel salt conduit assembly 560, a fuel salt conduit 562, one or more isolation valves 564, an inert gas conduit assembly 566, an inert gas conduit 568, one or more isolation valves 570, end caps 580a, 580b, end cap volumes 582a, 582b, cap structures 584a, 584b, cap legs 586a, 586b, 588a, 588b; redundant explanation of which is omitted for clarity. The fuel salt shipping system may rest on a ground surface 301.

Notwithstanding the foregoing similarities, the fuel salt conduit assembly 560 may be configured for loading of the fuel salt, rather than for both loading and unloading as in the configuration of FIGS. 3 and 4 describe herein. For example, and as shown in FIG. 5, the fuel salt conduit assembly 560 may include an elongated portion 563 that directs the liquid flow of fuel salt toward a bottom of the inner volume 526. At a bottom portion of the inner volume 526, the inner container 524 may include angled region 531a, 531b that direct the molten salt material there toward a mouth region 532. Further, the system 500 is shown as including at or proximal to the mouth region 532, a fuel salt unloading conduit assembly 572. The fuel salt unloading conduit assembly 572 may include a fuel salt conduit 574 and one or more isolation valves 576. The fuel salt conduit 574 may penetrate the outer container 504 and the inner container 524 and fluidically couple the inner volume 526 to an external environment of the system 500. The fuel salt conduit 574 may be selectively closeable by the one or more isolation valves 576 to maintain a seal between the inner volume 526 and the external environment. While a single isolation valve 576 is shown in FIG. 5 for purposes of clarity, it will be appreciated that two or more valves may be used as appropriate to maintain multiple points of isolation between the fuel salt of the inner volume 526 and the external environment of the system 500. The fuel salt conduit 574 is configured to permit unloading of the fuel salt from the inner volume 526. For example, the one or more isolation valves 576 may be operated to permit the gravitational release of fuel salt held within the inner volume 526. The fuel salt may be released to a fuel prep module or reactor module of a deployment system, as described herein. As the fuel salt is gravitationally drained from the inner volume 526 via the fuel salt conduit 574, inert gas may be supplied to the inner volume 526 via the inert gas conduit 568. The receipt of such inert gas may facilitate the flowing of the fuel salt from the inner volume 526 while continuing to maintain an inert environment about the fuel salt as the fuel salt exits the system 500.

Following transportation and reliquification of the fuel salt, the system 500 may be at a deployment site. Depending on the configuration of the reactor module (for example, reactor module 701 of FIG. 7) or the geological characteristics of the deployment site, it may be impractical to invert the fuel salt system for unloading. The fuel salt system of the present invention anticipates this need and provides means for unloading the fuel salt without requiring the container to be inverted and without requiring gravitational draining of the fuel salt. For example, and with reference to system 500 of FIG. 5, the fuel salt conduit assembly 560 may be configured for loading and unloading of the fuel salt. The fuel salt may be unloaded through the elongated portion 563 and subsequently through the fuel salt conduit assembly 560 by pressurizing the inner volume 526 with inert gas provided by the inert gas conduit assembly 566. For example, the system 500 may remain in an upright position with the fuel salt unloading conduit assembly 572 proximal to the ground surface 301, and the fuel salt conduit assembly 560 may be utilized as means for unloading or dispensing the fuel salt while the one or more isolation valves 576 remain closed. The inert gas conduit assembly 568 may then introduce a gas (e.g., an inert gas) into the inner volume 526 such that the pressure of the inner volume 526 increases. This may be followed by activating the one or more isolation valve 564. The pressure of the inner volume 526 may be steadily increased, by the input of steadily more gas, to force the contents therein (e.g., fuel salt in the liquid phase) to rise through the elongated portion 563, through the fuel salt conduit assembly 560, and out of the system 500 to an environment of the system 500. For example, the fuel salt conduit assembly 560 may be fluidly connected to a fuel preparation assembly of a reactor module, such as fuel preparation assembly 703 and reactor module 701 of FIG. 7. In this way, by increasing the pressure of the inner volume utilizing inert gas from an inert gas conduit, the inner volume of the container may dispense fuel salt to a fuel salt preparation module without the need to invert the container or gravitationally drain the inner volume. In all other respects, the system may include components substantially similar to and function substantially similar to fuel salt system 300 and fuel preparation assembly 703 of FIG. 7.

Figure 6A:
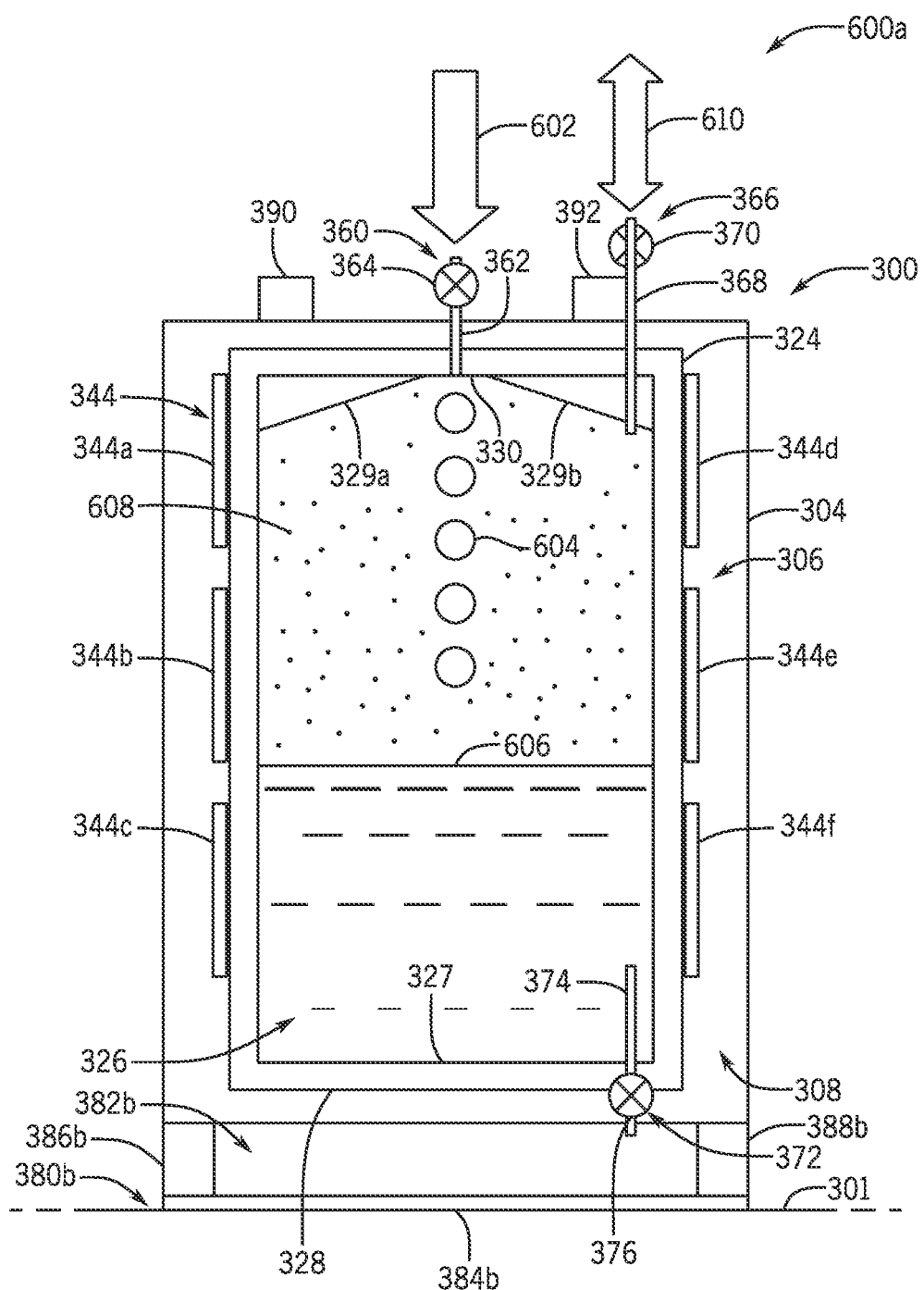
FIG. 6A depicts the fuel salt shipping system of FIG. 3 in a first configuration.
Figure 6B:
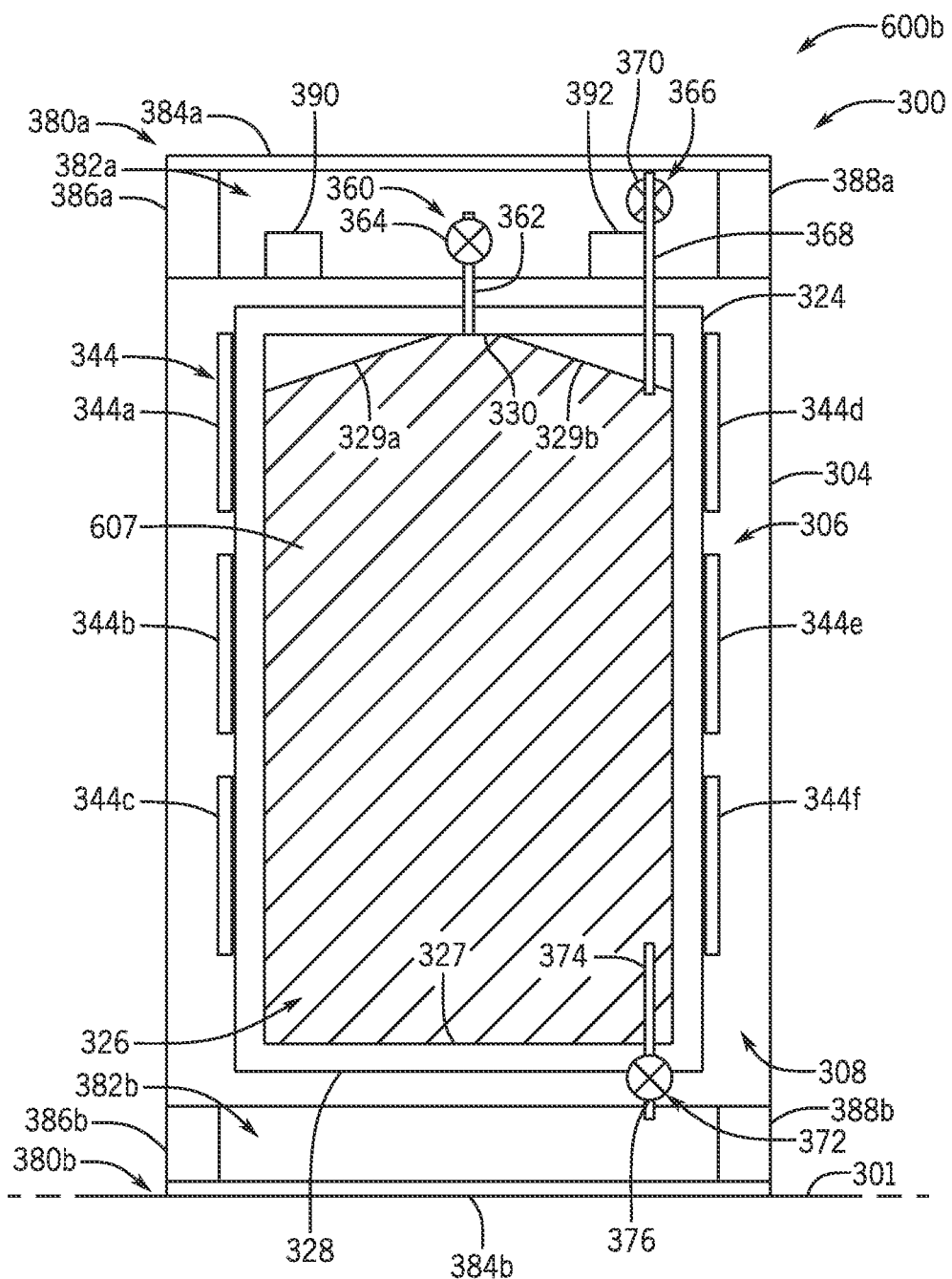
FIG. 6B depicts the fuel salt shipping system of FIG. 3 in a second configuration.
Figure 6C:
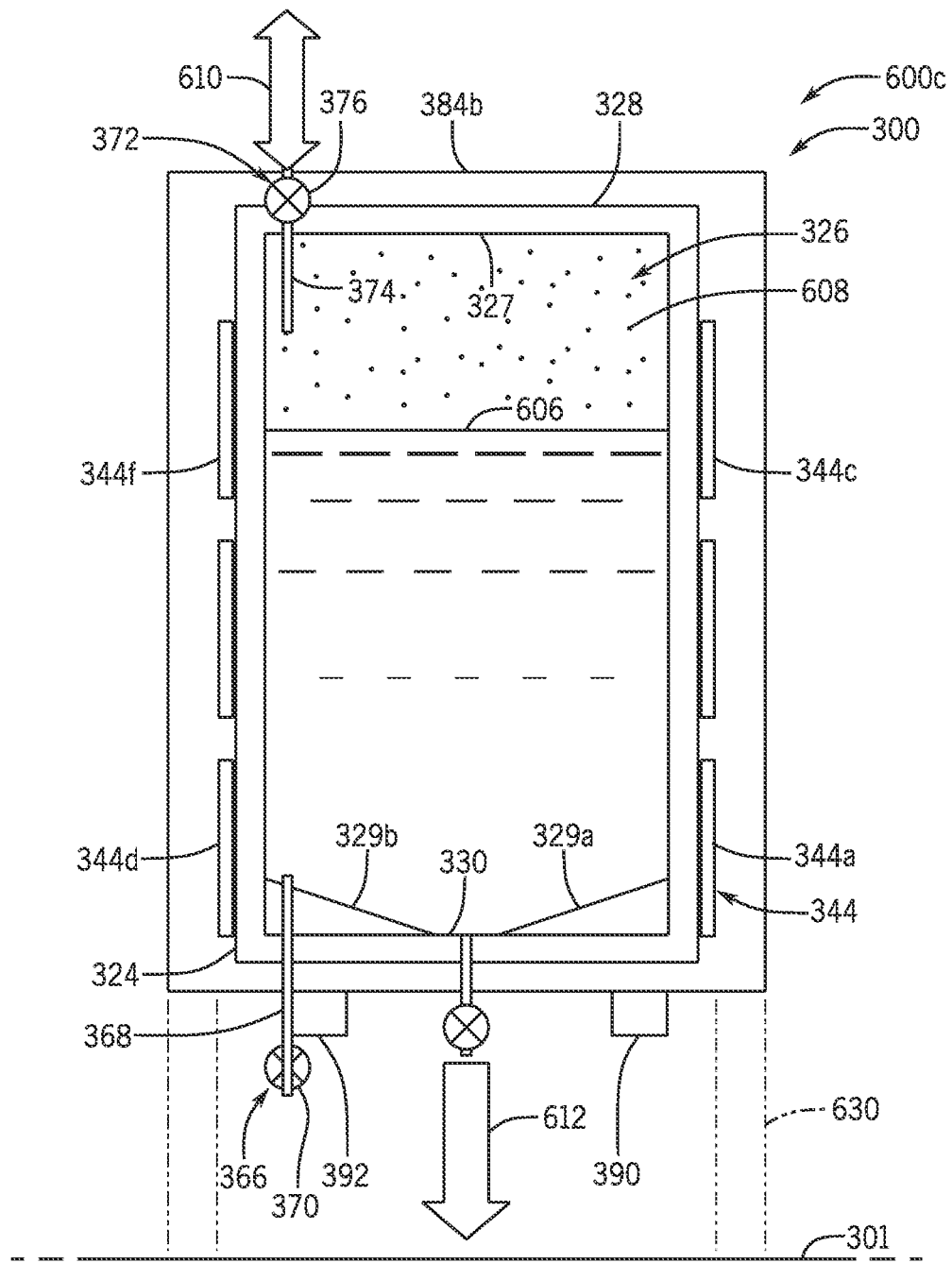
FIG. 6C depicts the fuel salt shipping system of FIG. 3 in a third configuration.

FIGS. 6A-6C depict example operations of the fuel salt system 300 described above in relation to FIGS. 3 and 4. In FIG. 6A, the fuel salt system 300 is shown in a first, loading configuration 600a in which the fuel salt system 300 is loaded with a flow of liquid phase fuel salt. In the loading configuration 600a, the fuel salt system 300 may be stood upright relative to the ground surface 301. A flow of liquid phase molten salt 602 may be introduced into the inner volume 326 of the inner container 324. The liquid phase molten salt 602 may travel through the conduit 362 such that a stream 604 of fuel salt enters the inner volume 326 and forms a pool 606 of fuel salt therein. The inner volume 326 may generally be filled with an inert gas 608 via the inert gas conduit 368 and inert gas flow 610. As the level of the pool 606 of fuel salt rises in the inner volume 326, the inert gas 608 may exit via the conduit 368. The pool 606 of fuel salt may remain in the liquid phase due to the operation of the heating system 344. In preparation for transport, the operation of the heating system 344 may cease such that pool 606 of liquid phase fuel salt is permitted to solidify within the inner volume 326. In FIG. 6B, the fuel salt system 300 is shown in an intermediate, transport configuration 600b in which the fuel salt held within the inner volume 326 remains in a solid state 607. The fuel salt may remain in the solid state 607 due to not receiving a heat output from the heating system 344. In the intermediate, transport configuration 600b, each of the end caps 380a, 380b may be attached to opposing longitudinal ends of the outer container 304. The end caps 380a, 380b may shield components of the system 300 arranged at such opposing longitudinal ends, as described herein. In FIG. 6C, the fuel salt system 300 is shown in a second, unloading configuration 600c in which the fuel salt held within the inner volume 326 is permitted to exit the inner volume 326. For example, in the second, unloading configuration 600c, the system 300 may be inverted, and optionally arranged on a stand 630, such that the fuel salt conduit 362 is arranged proximal the ground surface 301. The heating system 344 may operate to impart a heat output to the molten fuel salt in order change a phase of the fuel salt from the solid state 607 to the liquid state of FIG. 6A. In this regard, the one or more valves 364 may be operated to release a flow 612 of a liquid fuel salt from the pool 606. Further, the inert gas conduit 374 may operate to allow a flow 610 of inert gas 608 into the inner volume 326 as the fuel salt exits the inner volume 326. The receipt of such inert gas 608 may facilitate the flowing of the fuel salt from the inner volume 326 while continuing to maintain an inert environment about the fuel salt as the fuel salt exits the system 300.

Figure 7:
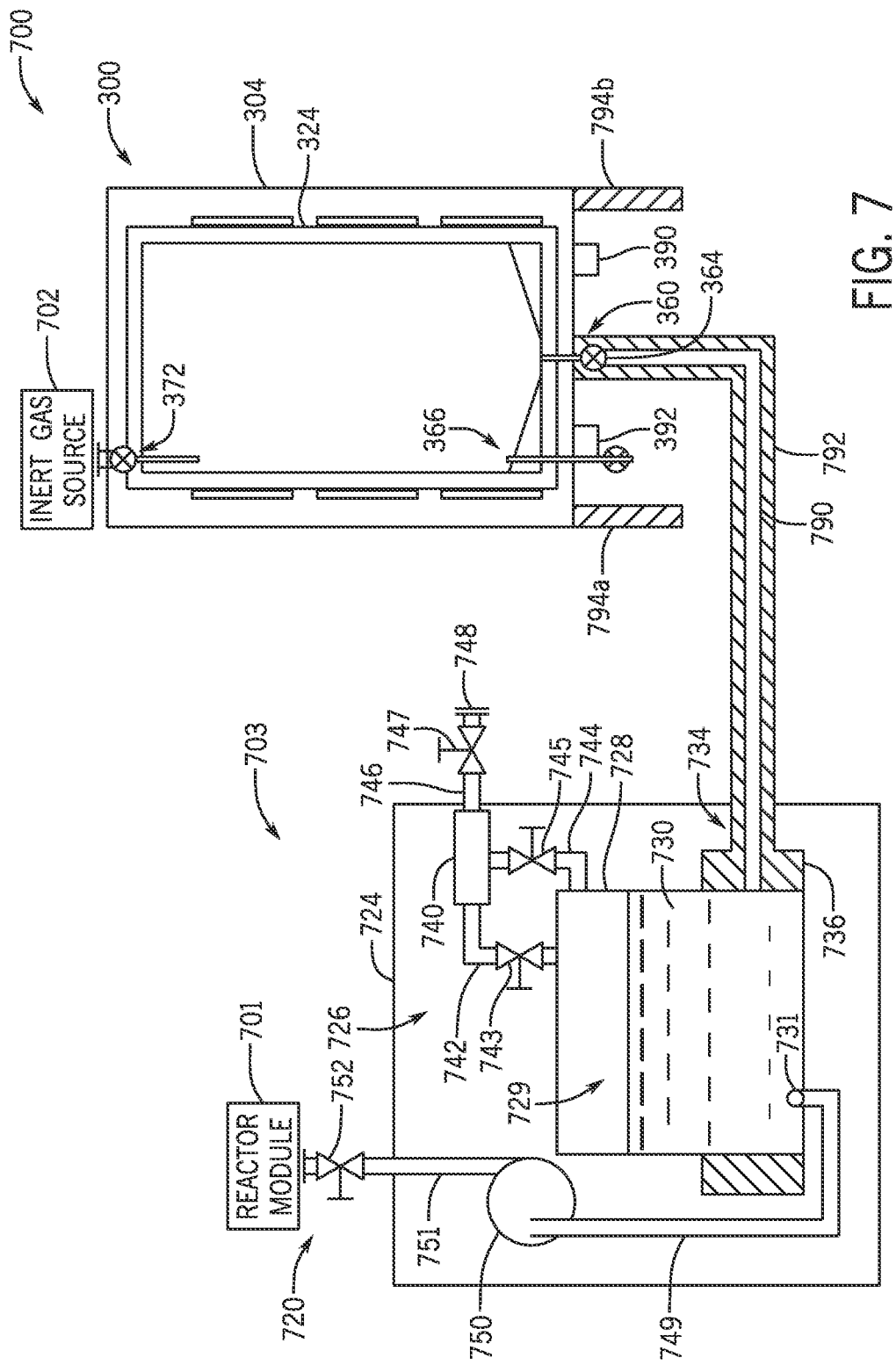
FIG. 7 depicts the fuel salt shipping system of FIG. 3 in operation with a fuel preparation assembly.

With reference to FIG. 7, the fuel salt shipping system 300 is shown within a system 700 in operation with a fuel prep assembly 703. The fuel prep assembly 703 may be or be a component of the fuel prep module 130 described herein in relation to FIGS. 1 and 2. As shown in FIG. 7, the fuel prep 703 is shown as including various components to cause the fuel salt to transfer therethrough. For example, the fuel preparation assembly 703 may include a portable container 724 defining a container volume 726. The portable container 724 may define an outermost shielding or enclosure for the functional components of the assembly 703, including a transfer tank 728 held therein. The transfer tank 728 may define a tank volume 729 that holds a quantity of fuel salt 730 therein.

To facilitate the flow of fuel salt from the fuel salt shipping system 300, the fuel preparation assembly 703 may include a trace heat assembly 734, including a fuel transfer portion 792 and the transfer tank portion 736. The trace heat assembly 734 may include a collection of resistance heaters and other equipment that are operable to increase a temperature of an adjoining component. The fuel salt 730 may freeze at room temperature, and thus the fuel salt may require an elevated temperature to transfer from the fuel salt shipping system 300 to a reactor module 701. In some cases, the trace heat assembly 734 may be a temporary or removable assembly whereby at least a portion of the assembly may be selectively removable from certain equipment.

The transfer tank 728 may further be fluidly coupled with one or more components that operate to filter and/or chemically treat the fuel salt 730. For purposes of illustration, FIG. 7 shows a treatment unit 740 to perform such functions. The transfer tank 728 and the treatment unit 740 may cooperate to circulate fuel salt therebetween via pipe segments 742, 744, flow through which may be controlled via associated valves 743, 745. In some cases, a secondary pump or other mechanism (not shown in FIG. 7) may be integrated with the pipe segments 742, 744 to promote circulation therebetween. The treatment unit 740 may optionally be coupled with input/output piping 746 and associated valve 747 whereby the treatment unit 740 may receive chemicals, instrumentation, and the like for treating the fuel salt in the treatment unit 740 via a port 748.

The transfer tank 728 may further be fluidly coupled with one or more components that facilitate the pumping of the fuel salt 730 through the fuel preparation assembly 703 and into the reactor module 701. For example, the transfer tank 728 may include a tank outlet 731 that fluidically couples the transfer tank 728 to a pump 750 via a pipe segment 749. In turn, the pump 750 may operate to increase a pressure of the fuel salt 728 such that the fuel salt 728 is routed from the pump 750 to the reactor module via a pipe segment 751 and an associated valve 752.

In operation, at a deployment or other reactor site, the fuel salt shipping system 300 may be fluidically coupled with the fuel prep assembly 703 for transfer of a fuel salt thereto. For example, the system 700 may include a transfer pipe 790 that fluidically couples the fuel salt conduit assembly 360 with the transfer tank 728. Further, the system 700 may include the heat trace or other heat element 792 that is wrapped about the transfer pipe 790 and operable to maintain the fuel salt flowing therethrough above a freeze temperature. In this regard, the fuel salt shipping system 300 may be arranged at a deployment site on stands 794a, 794b and associated with an inert gas source 702. The one or more valves 364 of the fuel salt conduit assembly 360 may be operated to release the liquid phase fuel salt into the transfer pipe 790 while the inert gas source 702 is used to fill the inner volume 326 with an inert gas.

Figure 8:
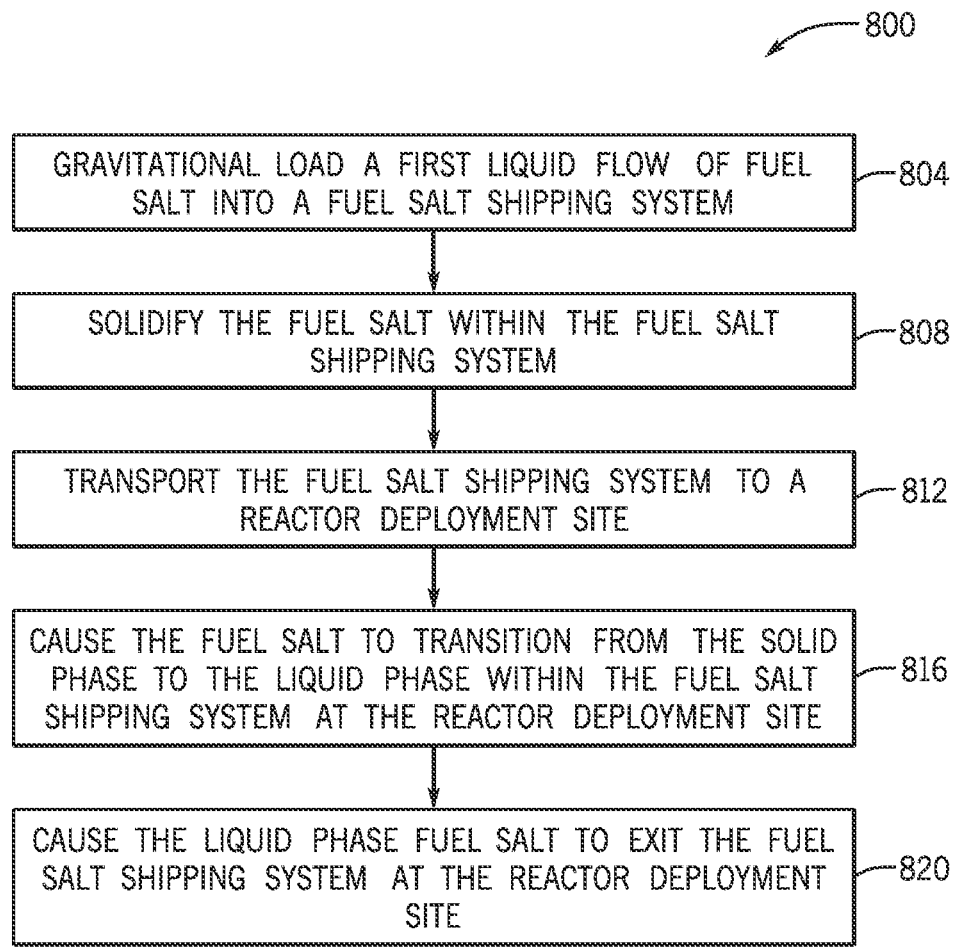
FIG. 8 depicts a flow diagram of a method of transporting molten salt.

FIG. 8 depicts a flow diagram of a method 800 of transporting molten salt. At operation 804, a first liquid flow of fuel salt is gravitationally loaded into a fuel salt shipping system. For example, and with reference to FIGS. 3 and 6, the flow of liquid phase molten salt 602 is gravitationally loaded into the fuel salt shipping system 300. For example, the flow of liquid phase molten salt 602 may progress through the fuel salt conduit 360 and form the pool 606 of liquid phase molten material within the inner volume 326 of the system 300. At operation 808, the fuel salt within the fuel salt shipping system is solidified. For example, and with reference to FIGS. 3 and 6B, the fuel salt is solidified in the inner volume 326 to form the solid state 607 of the fuel salt. For example, the heating system 344 may be disengaged or otherwise operated in a manner to permit the cooling of the fuel salt to a freezing temperature of the fuel salt. In the solid phase, as per operation 812, the fuel salt shipping system is transported to a reactor deployment site. For example, and with continued reference to FIGS. 3 and 6B, the fuel salt shipping system 500 including fuel salt in the solid state 607 may be transported via a semi-trailer truck to remote site where at a nuclear reactor is deployed for receipt of nuclear fuel held within the system 300.

At operation 816, the fuel salt is caused to transition from the solid phase to the liquid phase within the fuel shipping system at the reactor deployment site. For example, and with reference to FIGS. 4 and 6C, the fuel salt shipping system 300 may be inverted upon arrival to the deployment site such that the fuel salt conduit 360 is arranged proximal the ground surface 301. The heating system 344 may activate one or more of the heaters 344a-344f to impart a heat output to the molten fuel salt of the inner volume 326 and to change a phase of the molten fuel salt held therein from a solid phase to a liquid phase. At operation 820, the liquid phase fuel salt is caused to exit the fuel salt shipping system at the reactor deployment site. For example, and with continued reference to FIGS. 4 and 6C, the one or more isolation valves 364 may be operated in order to cause a gravitational release of the liquid phase fuel salt held within the pool 606. The liquid phase fuel salt may exit the fuel salt shipping system 300 for processing by, for example, the fuel prep assembly 703 described in relation to FIG. 7 and/or other components of modules of the deployment system 100 described herein. During said gravitational draining of the liquid phase fuel salt, the inner volume 326 may be filled with an inert gas, as described herein.

Other examples and implementations are within the scope and spirit of the disclosure and appended claims. For example, features implementing functions may also be physically located at various positions, including being distributed such that portions of functions are implemented at different physical locations. The foregoing description, for purposes of explanation, uses specific nomenclature to provide a thorough understanding of the described examples. However, it will be apparent to one skilled in the art that the specific details are not required in order to practice the described examples. Thus, the foregoing descriptions of the specific examples described herein are presented for purposes of illustration and description. They are not targeted to be exhaustive or to limit the examples to the precise forms disclosed. It will be apparent to one of ordinary skill in the art that many modifications and variations are possible in view of the above teachings.

What is claimed is:

1. A fuel salt shipping system comprising
an outer container defining an outer containment volume;
an inner container disposed within the outer containment volume and defining an inner volume configured to contain a molten fuel salt, the inner container and the outer container cooperating to define an annulus region therebetween;
a fuel salt conduit penetrating the outer container and the inner container and fluidically coupling the inner volume to an external environment of the system, the fuel salt conduit selectively closeable to maintain a seal between the inner volume and the external environment;
a heating system including a heater disposed in the annulus space and configured to impart a heat output to the molten fuel salt of the inner volume and change a phase of the molten fuel salt held therein from a solid phase to a liquid phase; and
an inert gas conduit penetrating the outer container and the inner container and fluidically coupling the inner volume to the external environment, the inert gas conduit selectively closeable to maintain a seal between the inner volume and the external environment, and
the inert gas conduit is configured to permit entry and exit of inert gas to and from the inner volume;
wherein the inert gas conduit is a first inert gas conduit penetrating from a first side of the outer container and a first side of the inner container,
the system further includes a second inert gas conduit penetrating the outer container and the inner container and fluidically coupling the inner volume to the external environment, the second inert gas conduit selectively closeable to maintain a seal between the inner volume and the external environment, and
the second inert gas conduit penetrating from a second side of the outer container and the inner container opposite the first side.

2. The system of claim 1, wherein the fuel salt conduit is configured to permit entry and exit of the molten fuel salt to and from the inner volume in the liquid phase or in the solid phase.

3. The system of claim 1, wherein the heat output from the heater is configured to maintain the molten fuel salt in the liquid phase within the inner volume.

4. The system of claim 1, wherein the heater is one of a bank of heaters of the heating system disposed in the annulus space, the bank of heaters cooperating to collectively impart the heat output to the molten fuel salt.

5. The system of claim 1, wherein the annulus space is filled with an insulative material.

6. The system of claim 5, further comprising neutron absorbers disposed within the insulative material.

7. The system of claim 1, wherein the annulus space is filled with an inert gas.

8. The system of claim 1, wherein the system is configured
in a first, loading configuration while remaining upright with the first side arranged opposite a ground surface to
receive a first liquid flow of the fuel salt via the fuel salt conduit, and
displace a volume of inert gas from the inner volume through the first inert gas conduit via said first liquid flow of the fuel salt, and
in a second, unloading configuration while remaining inverted with the second side arranged opposite the ground surface to
gravitationally release a second liquid flow of the fuel salt via the fuel salt conduit, and
backfill an evacuated portion of the inner volume with an inert gas flow through the second inert gas conduit.

9. The system of claim 8, wherein the system is further configured
in a transportation configuration to
permit the molten fuel salt of the first liquid flow to transition from the liquid phase to the solid phase, and
cause the molten salt to subsequently transition from the solid phase to the liquid phase, using the heating system, and thereby produce the second liquid flow.

10. The system of claim 1, further comprising monitoring equipment disposed proximal the fuel salt conduit and configured to detect one or both of a neutron level and gas pressure from the inner containment volume.

11. The system of claim 10, wherein
the system further comprises a set of end caps, the set of end caps removably couplable with opposite ends of the outer container and defining a further containment barrier thereabout, and
at least one end cap of the set of end caps fully encompasses and closes the fuel salt conduit and the monitoring equipment therein.

12. A deployment system for a molten salt reactor, the system comprising
the fuel salt shipping system of claim 1;
a nuclear reactor system including functional components of a molten salt reactor; and
a fuel preparation system couplable with the fuel salt shipping system and the nuclear reactor system and configured to transfer the fuel salt to a reactor module.

13. The system of claim 12, wherein the fuel preparation system is further configured to treat the fuel salt enroute to the reactor module, including filtering the fuel salt, chemically altering the fuel salt, or heating the fuel salt.

14. The system of claim 12, wherein the fuel salt shipping system, the nuclear reactor system, and the fuel preparation system are each individually deliverable to a reactor deployment site via a semi-trailer truck.

* * * * *